UNITED STATES PATENT OFFICE.

JOHN HARVEY KELLOGG, OF BATTLE CREEK, MICHIGAN.

FLAKED CEREALS AND PROCESS OF PREPARING SAME.

SPECIFICATION forming part of Letters Patent No. 558,393, dated April 14, 1896.

Application filed May 31, 1895. Serial No. 551,192. (No specimens.)

*To all whom it may concern:*

Be it known that I, JOHN HARVEY KELLOGG, of Battle Creek, in the county of Calhoun and State of Michigan, have invented a certain new and useful Alimentary Product and Process of Making the Same, of which the following is a full, clear, and exact description.

My invention relates to an improved alimentary product and to the process of making it; and the object of the improvement is to provide a food product which is in a proper condition to be readily digested without any preliminary cooking or heating operation, and which is highly nutritive and of an agreeable taste, thus affording a food product particularly well adapted for sick and convalescent persons.

To this end my invention consists in the new process and the new article of manufacture hereinafter described and claimed.

In carrying out my invention I use as a material from which to produce my improved alimentary product wheat, which is preferably in its natural state, although it may be slightly pearled without materially affecting the desired result, barley or oats prepared by the removing of a portion of the outer husks, corn, and other grains.

The steps of the process are as hereinafter described.

First. Soak the grain for some hours—say eight to twelve—in water at a temperature which is either between 40° and 60° Fahrenheit or 110° and 140° Fahrenheit, thus securing a preliminary digestion by aid of cerealin, a starch-digesting organic ferment contained in the hull of the grain or just beneath it. The temperature must be either so low or so high as to prevent actual fermentation while promoting the activity of the ferment. This digestion adds to the sweetness and flavor of the product.

Second. Cook the grain thoroughly. For this purpose it should be boiled in water for about an hour, and if steamed a longer time will be required. My process is distinctive in this step—that is to say, that the cooking is carried to the stage when all the starch is hydrated. If not thus thoroughly cooked, the product is unfit for digestion and practically worthless for immediate consumption.

Third. After steaming the grain is cooled and partially dried, then passed through cold rollers, from which it is removed by means of carefully-adjusted scrapers. The purpose of this process of rolling is to flatten the grain into extremely thin flakes in the shape of translucent films, whereby the bran covering (or the cellulose portions thereof) is disintegrated or broken into small particles, and the constituents of the grain are made readily accessible to the cooking process to which it is to be subsequently subjected and to the action of the digestive fluids when eaten.

Fourth. After rolling the compressed grain or flakes having been received upon suitable trays is subjected to a steaming process, whereby it is thoroughly cooked and is then baked or roasted in an oven until dry and crisp.

The finished product thus consists of extremely thin flakes, in which the bran (or the cellulose portions thereof) is disintegrated and which have been thoroughly cooked and prepared for the digestive processes by digestion, thorough cooking, steaming, and roasting. In this respect it differs from any similar alimentary article which has been heretofore produced.

The preliminary cerealin digestion converts a part of the starch into dextrin, and thus causes the grain to become somewhat glutinous, whereby I am enabled to apply a high pressure during the rolling process without any necessity of heating the rollers, and thus very thin flakes are produced which are not brittle and are readily roasted to assume a sweet flavor. The cooking before the rolling also assists in rendering the latter operation easier and more effective, and together with steaming or cooking after rolling brings the product into a condition in which it is readily soluble and digestible without any further cooking. The steaming or cooking and baking or roasting processes may be effected in the same apparatus, the product being first subjected to the action of steam, and, after the steam is cut off, to the action of dry heat.

The product being perfectly sterilized will keep indefinitely. It is a perfectly cooked food and ready to be eaten at once with no preparation whatever. It is very palatable, and hence often eaten in a dry state. Besides having the physical property of perfect solubility it is visually readily distinguishable from ordinary preparations of wheat and allied grains which have been merely steamed to a degree sufficient to soften them exteriorly, preparatory to passing them between rollers, since it has a slightly brown color, owing to the conversion of the starch into dextrin, and is in the form of large and very thin flakes of practically uniform thickness.

Having thus described my invention, I claim as new and desire to secure by Letters Patent—

1. The process hereinbefore described for the manufacture of an improved alimentary product, which consists, first, in soaking the grain in water for some hours, whereby it is subjected to a preliminary digestion with its contained cerealin, and at temperature which prevents actual fermentation; second, subjecting the previously-soaked grain to heat for a time sufficient to completely cook the starch; third, drying the grain; fourth rolling the grain between cold rollers; and fifth, baking the flakes until thoroughly dry and crisp, as specified.

2. The improved cooked alimentary product, from grain such as wheat, hereinbefore described, which exists in the form of large, attenuated, baked, crisp and slightly brown flakes of practically uniform thickness, the same being readily soluble and containing dextrin, as specified.

JOHN. HARVEY KELLOGG.

Witnesses:
NEWTON K. SHELDEN,
GEO. W. THOMASON.